United States Patent [19]

Galvin et al.

[11] Patent Number: 4,655,544

[45] Date of Patent: Apr. 7, 1987

[54] ELECTRICAL SHOCK PROOF FIBER OPTIC CONTROL SYSTEM

[76] Inventors: John J. Galvin, 1731 Fillmore St., Bronx, N.Y. 10460; Richard L. Miller, 12 Parkside Dr., Dix Hills, N.Y. 11746

[21] Appl. No.: 694,138

[22] Filed: Jan. 23, 1985

[51] Int. Cl.$^4$ .............................................. G02B 6/42
[52] U.S. Cl. .......................... 350/96.20; 250/227; 350/96.10; 350/96.24
[58] Field of Search .............. 350/96.10, 96.15, 96.20, 350/96.22, 96.24; 250/227

[56] References Cited

U.S. PATENT DOCUMENTS

| | | | |
|---|---|---|---|
| 3,805,048 | 4/1974 | Brennesholtz | 350/96.2 X |
| 3,941,485 | 3/1976 | Madden | 350/96.2 X |
| 4,184,070 | 1/1980 | McBride | 250/227 |
| 4,193,662 | 3/1980 | Hara | 350/96.15 |
| 4,356,395 | 10/1982 | Miller | 250/227 |
| 4,359,637 | 11/1982 | Perren | 250/227 |

FOREIGN PATENT DOCUMENTS 2651776  5/1977  Fed. Rep. of Germany ..... 350/96.2

Primary Examiner—John Lee
Attorney, Agent, or Firm—Richard L. Miller

[57] ABSTRACT

An electrical shock proof fiber optic control system is disclosed which provides the equivalent of a multiple contact slide switch in optical form along with a fiber optic decoder/interface. Provision is made for single pole switches and multiple throw switches with any number of switch contacts. A novel proportional controller is also provided which varies the amount of light transmitted to a photo-detector by placing a variable optical density filter in series with the light path at the remote control point. One embodiment uses a sliding filter whose optical density is proportional to the lateral displacement of the filter.

4 Claims, 5 Drawing Figures

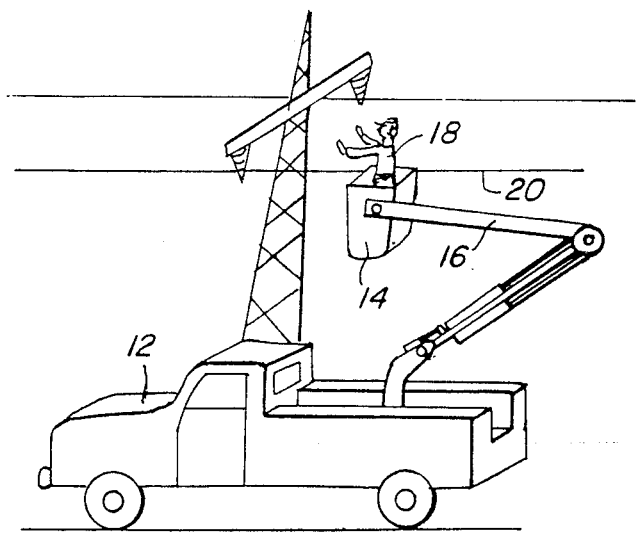
Fig. 1
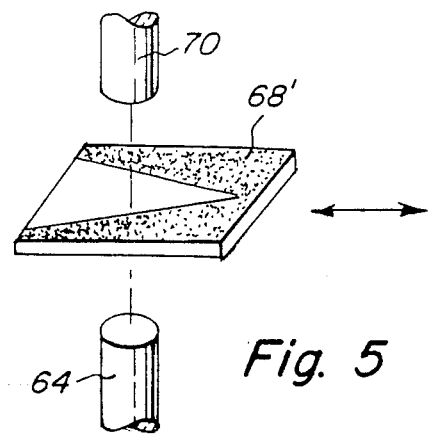
Fig. 5
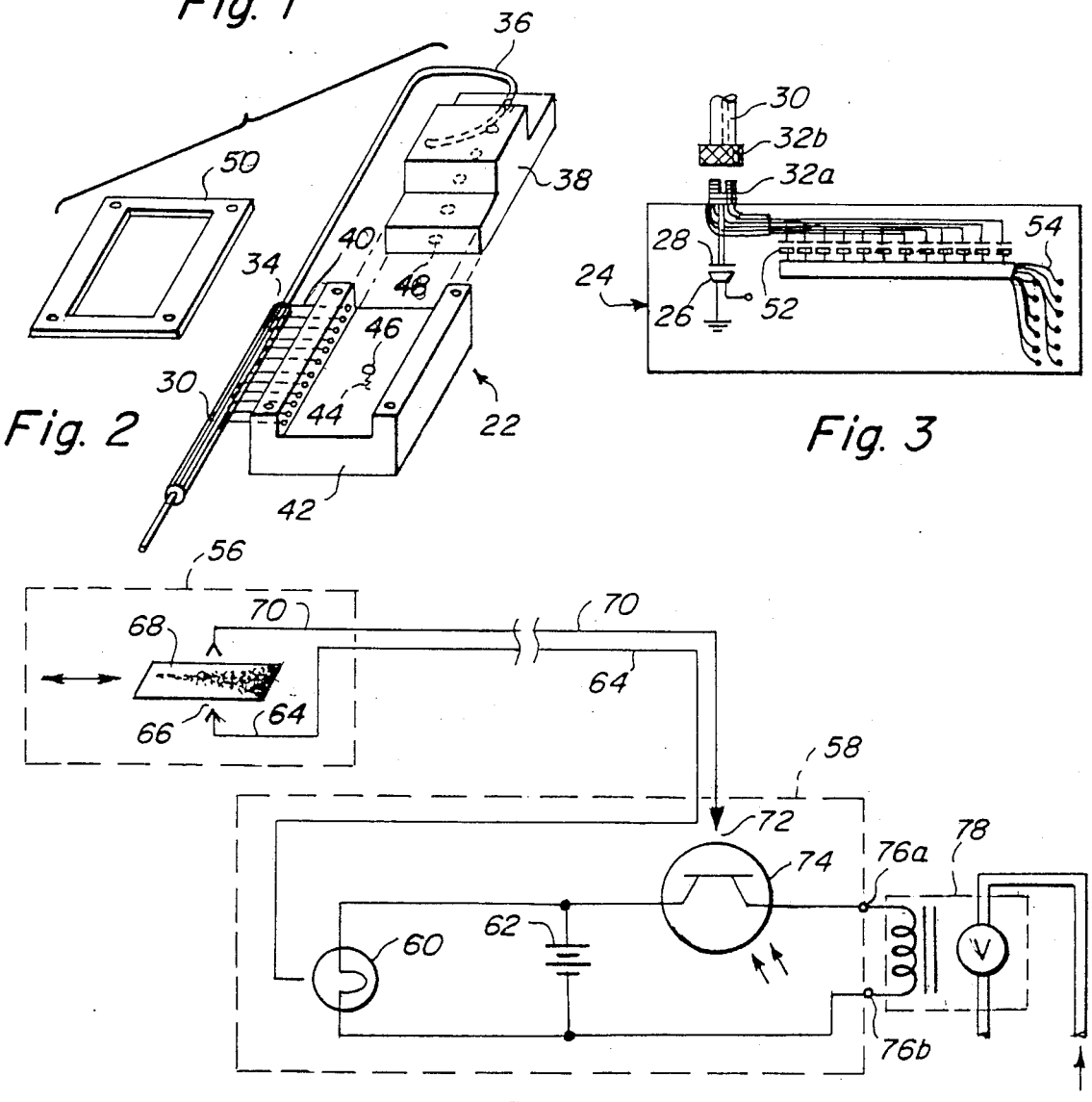
Fig. 2
Fig. 3
Fig. 4

ELECTRICAL SHOCK PROOF FIBER OPTIC CONTROL SYSTEM

BACKGROUND OF THE INVENTION

The present invention relates generally to the field of electrical safety and, more specifically, to electro-optic control systems which isolate equipment operators from potentially lethal voltages.

There are many circumstances in which electrical isolation of control circuitry is necessary in order to assure personal safety. One outstanding example is the repair of high-tension power lines. Service personnel must often work where power lines are live or where there is some question as to the off-status of a particular line. At the present state-of-the-art a number of lift trucks are available which elevate the operator in a basket in order to put him in close enough proximity to a power line to be able to service it.

The basket itself is often made of a glass fiber compound and an additional insulator is placed between the workbasket and the winched crane assembly. Controls needed to vary the elevation of the workbasket and to control actuators at the base are presently hydraulic. Hydraulic pilot lines are run into the workbasket along with hydraulic controllers. Under ideal conditions the hydraulic lines are almost ideal insulators.

However, hydraulic lines occasionally leak and leave a residue that builds up with time. Carbon bearing deposits contaminate the hydraulic fluid residues leaving a relatively low resistance ground path. At the extremely high voltages encountered in electrical power transmission reaching the lethal current of 100 milliamperes is likely given leakage caused by the contaminated residues. The low resistance leakage path also endangers anyone near the line lift truck itself.

SUMMARY OF THE INVENTION

It is, therefore, a primary object of the present invention to provide an electrical shock proof fiber optic control system which uses fiber optics instead of hydraulics or pneumatics to control systems external to the control system itself.

A further object is to provide an electrical shock proof fiber optic control system which permits remote fiber optic switching of a number of circuits. On the remote end of the system, the fiber optic analogue of a single-pole-n-throw electrical switch and the fiber optic analogue of a double-pole-n-throw electrical switch are provided. On the controlled end of the system a fiber optic decoder/interface is provided.

A yet further object is to provide an electrical shock proof fiber optic control system which permits proportional control of a remote circuit. On the remote end of the system, the fiber optic analogue of an electrical potentiometer or rheostat is provided. On the controlled end of the system a fiber optic proportional decoder/interface is provided.

A yet still further object is to provide an electrical shock proof fiber optic control system which is simple to operate and maintain and inexpensive to operate.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of a vehicle having a line lift incorporating the instant invention.

FIG. 2 is an exploded perspective view of one embodiment of the fiber optic slide switch.

FIG. 3 is a diagrammatic view of the light controlled decoder/interface which cooperates with the fiber optic switch shown in FIG. 2.

FIG. 4 is a schematic diagram of a second embodiment of the fiber optic proportional control system.

FIG. 5 is an enlarged exploded perspective view illustrating another way of encoding the optical proportional control signal.

DETAILED DESCRIPTION OF THE PREFERRED EMBODIMENTS

The overall need for the invention may best be understood with reference to FIG. 1 which shows a line lift truck 12 with an insulated workbasket 14 which is supported by an insulated lift bar 16. As service worker 18 approaches high tension line 20, if the insulation between worker 18 and line lift truck 12 has deteriorated due to the leakage of hydraulic fluid and its subsequent contamination with particulate carbon worker 18 is in serious danger.

FIGS. 2 and 3 illustrate a system which protect worker 18 from danger due to electrical shock by providing a fiber optic control system instead of a hydraulic or pneumatic control system. FIG. 2 illustrates the fiber optic slide switch 22 which is mounted in insulated basket 14 and FIG. 3 illustrates the fiber optic decoder/interface 24 which would be mounted to the chassis of line lift truck 12.

Light is generated by light source 26 which may be an incandescent lamp, a light emitting diode, a gas discharge, an electroluminescent panel, or any other light emitter. A fiber optic bundle 30 includes a fiber optic source fiber 36 and a plurality of receiver fibers 40. Light enters the fiber optic source fiber at 28, is transmitted though fiber optic bundle 30 via fiber optic connectors 32a and 32b, exits the bundle at 34 and continues as fiber 36 at which point it is embedded in slide 38. The end of fiber 36 is flush with the left side of slide 38. The fiber optic receiver strands, 40 are embedded in switch base 42 and are aligned so that light exiting fiber 36 enters which ever of the fibers embedded in the switch base 42 is in alignment. Since twelve embedded fibers are shown along with the one source fiber 36, this switch may be thought of as a single-pole-12-throw slide switch. The source fiber 36 transmits the light in one direction and the receiver fibers 40 transmit light in the opposite direction. The connector precisely aligns each and every fiber optic strand in the bundle with the corresponding fiber optic strands within the decoder/interface 24 in order to maintain a one-to-one correspondence.

Another light emitting strand, similar to 36, could have been placed along the right edge of slide 38 together with twelve more strands embedded in switch base 42 thereby producing a double-pole-twelve-throw slide switch. It is, therefore understood, that many switching arrangements could be realized without departing from the spirit of the invention.

A detent spring 44 and ball 46 engage detents such as 48 in slide 38. This helps to guarantee perfect alignment of the light emitting strand 36 and the rest of the strands as they are switched. An escutcheon plate 50 covers the completed assembly.

Light returning from fibers embedded in switch base 42 returns via fiber optic bundle 30, through fiber optic connectors 32b and 32a and is incident upon one of the photodetectors typified by 52. The electrical output of the photodetectors is fed to an electrical connector 54 and therefrom to the devices to be controlled which may themselves be electrical, hydraulic or pneumatic.

There are a number of applications which require proportional control. For example, it might be desirable to control the speed at which insulated basket 14 is lowered or raised. Although this could be accomplished with a step controller using discrete steps as illustrated in FIGS. 2 and 3, proportional control, as illustrated in FIG. 4 allows continuous control.

FIG. 4 illustrates the use of a fiber optic proportional controller 56 together with a cooperating fiber optic proportional decoder/interface 58. Light source 60, powered by battery 62 is transmitted by fiber optic strand 64 and exits at 66 where it must pass through a sliding filter 68 before entering fiber optic strand 70. This light exits at 72 where it controls the current flow through photo-transistor 74.

The output of photo-transistor 74 may be used in a number of ways. In FIG. 4, the output, at terminals 76a and 76b are used to control a dc operated hydraulic valve 78. Meanwhile, sliding filter 68 has an optical density which is proportional to its lateral displacement. The further to the left it is moved the less light is transmitted and the lower the control signal from decoder-/interface 58 will be and vice versa.

In FIG. 5 an enlarged view of another embodiment of the filter reveals a filter 68' which increases in optical density as filter 68' is moved from right-to-left.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:
1. An electric shock proof fiber optic control system, comprising in combination:
    (a) a light source;
    (b) a fiber optic decoder/interface comprising a plurality of n photodetectors each controlling a respective electrical connector;
    (c) a fiber optic slide switch comprising a slide and a switch base across which the slide can move; and
    (d) a fiber optic bundle having a number of fiber optic strands, one of said strands forming a transmitter strand having an input end receiving light from said light source and an output end embedded in said slide and flush with one side of said slide and passing light in a first direction in said bundle, the other fiber optic strands forming a plurality of n receiver strands each having a respective input end embedded along a straight line in said switch base and a respective output end respectively coupled to one of the photodetors and passing light in an opposing direction in said bundle, whereby a user may select which of said n receiver strands embedded in said switch base receives illumination thereby creating a single-pole-n-throw fiber optic, electrically isolated switch.

2. Electrical shock proof fiber optic control system, as recited in claim 1, further comprising a slide into which two fiber optic transmitter strands are embedded and exit at opposite sides of said slide; said switch base being U-shaped having opposing sides, and n matching fiber optic receiver strands embedded on both sides of said switch base, such that the result is a double-pole-n-throw switch.

3. An electrical shock proof fiber optic control system, as recited in claim 1, further comprising a detent ball and a detent spring which biases said detent ball and is retained on said switch base, and a series of detents on the underside of said slide such that said slide will only be seated when said detent ball enters one of said detents, thereby, assuring proper alignment of said fiber optic strands embedded in said slide and fiber optic strands embedded in said switch base.

4. An electrical shock proof fiber optic control system, as recited in claim 1, further comprising an escutcheon plate which attaches to said switch base once said slide has been installed whereby said escutcheon plate acts as a protective cover.

* * * * *